United States Patent

[11] 3,627,852

[72] Inventors Itsuho Aishima
 Tokyo;
 Hisaya Sakurai, Kawasaki-shi; Atsushi Kitaoka; Yoshihiko Katayama, both of Nobeoka-shi, all of Japan
[21] Appl. No. 699,313
[22] Filed Jan. 22, 1968
[45] Patented Dec. 14, 1971
[73] Assignee Asahi Kasei Kogyo Kabushiki Kaisha Kita-ku, Osaka, Japan
[32] Priority Feb. 2, 1967
[33] Japan
[31] 42/6295

[54] IMPACT RESISTANT POLYMER COMPOSITIONS
 7 Claims, No Drawings
[52] U.S. Cl. ................................................. 260/876 B,
 260/878 B, 260/897 A
[51] Int. Cl. ......................................................... C08f 29/12,
 C08f 15/04
[50] Field of Search ........................................... 260/876 B,
 897 A, 878 B

[56] References Cited
 UNITED STATES PATENTS

| | | | |
|---|---|---|---|
| 3,487,128 | 12/1969 | Okazaki et al. .............. | 260/876 |
| 3,517,086 | 6/1970 | Shirayama et al. ........... | 260/876 X |
| 3,515,775 | 6/1970 | Combs et al. ................ | 260/876 X |
| 3,256,367 | 6/1966 | Jayne ........................... | 260/897 A |
| 3,262,992 | 7/1966 | Holzer et al. ................ | 260/876 B |
| 3,354,239 | 11/1967 | Short............................ | 260/897 A X |

*Primary Examiner*—Murray Tillman
*Assistant Examiner*—H. Roberts
*Attorney*—Robert D. Flynn

ABSTRACT: A polypropylene composition having an excellent impact resistance at low temperatures comprising 50–90 percent by weight of crystalline polypropylene, 5–30 percent by weight of polyethylene and 5–40 percent by weight of ethylene/propylene block copolymer having an average molecular weight of not less than 10,000, an ethylene content of 7–93 mol percent and an optional recurring cycle.

IMPACT RESISTANT POLYMER COMPOSITIONS

BACKGROUND OF THE INVENTION

1. Field of the Invention:

This invention relates to an impact resistant composition mainly comprising crystalline polypropylene. More particularly, it relates to a ternary composition having remarkably improved impact resistance, particularly that at low temperatures, obtained by blending a major portion of crystalline polypropylene with minor portions of polyethylene and ethylene/propylene block copolymer.

2. Description of the Prior Art

The stereospecific highly crystalline polypropylene obtained by polymerizing propylene in the presence of stereospecific polymerization catalysts has a high rigidity and strength and excellent resistance to high temperature, thus, it is used for the manufacture of shaped articles, films and fibers of various uses in recent years.

However, one of the fundamental drawbacks of the crystalline polypropylene is that it is quite brittle at low temperatures, thus, the use in the field where an impact resistance, particularly that at low temperatures, is required has been restricted. Thus, there has been attempted to improve the impact resistance at low temperatures of crystalline polypropylene.

For example, there has been proposed a process in which crystalline polypropylene is blended with a synthetic rubber as a reinforcing agent to improve the drawback. However, in order to improve the impact resistance at low temperatures of crystalline polypropylene to a practical extent, a considerably large amount of synthetic rubber must be blended therewith. The blending of a large amount of rubber drastically deteriorates the excellent rigidity, strength and resistance to high temperature, which are the features of crystalline polypropylene, thus, it is disadvantageous from the standpoint of the balancing of the physical properties.

Another process proposed heretofore is an attempt to improve the impact resistance at low temperatures by blending polyethylene with crystalline polypropylene. In this process, however, true as it is that there occurs no important damage in the superior properties of crystalline polypropylene such as the rigidity, strength and resistance to high temperature, as a matter of fact, the impact resistance at low temperatures can be improved very little even if a considerable amount of polyethylene is incorporated into the crystalline polypropylene.

There has been proposed still another process for improving the impact resistance of crystalline polypropylene by block copolymerizing propylene with ethylene to form ethylene/propylene block copolymer. However, the process is by no means advantageous from not only the operational but also an economical standpoints, since the production of such a copolymer requires critical control and operation and the production cost is increased due to the complicated process, in order to obtain practically useful copolymer having improved impact resistance.

SUMMARY OF THE INVENTION

We have found, as a result of our concentrated efforts, a novel and useful composition in which the impact resistance at low temperatures of crystalline polypropylene which has never been improved by prior art processes known heretofore is amazingly enhanced without deteriorating the rigidity, strength and resistance to high temperature which are the features of the crystalline polypropylene.

This invention has its basis on an entirely novel finding which cannot possibly be anticipated by the prior arts known heretofore.

That is, in accordance with this invention, there is provided a polypropylene composition having a remarkably improved impact resistance at low temperatures comprising a major portion of crystalline polypropylene and minor portions of polyethylene and ethylene/propylene block copolymer having an optional recurring cycle.

One of the features of the composition obtained according to this invention is that it has remarkably excellent impact resistance at low temperatures.

Another feature of the present composition is that it retains the rigidity, strength and resistance to high temperature as high as those of crystalline polypropylene, together with the remarkably excellent impact resistance at low temperatures.

Still another feature of the present composition is that it is inexpensive as compared with ethylene/propylene block copolymer and it affords shaped articles, fibers, films, etc., having well-balanced physical properties.

The features of this invention will be explained more practically in the following:

The impact resistance at low temperatures of a binary composition obtained by blending the same amount of polyethylene as contained in the present composition with crystalline polypropylene is not improved at all, and, that of a binary composition obtained by blending the same amount of ethylene/propylene block copolymer as contained in the present composition with crystalline polypropylene is improved not so much as practically useful.

In contrast, the ternary composition of this invention is a practically useful composition having well-balanced physical properties including a remarkably excellent impact resistance at low temperatures and a rigidity, strength and resistance to high temperature as high as those of crystalline polypropylene.

If the same degree of improvement in the impact resistance at low temperatures as achieved in the present composition is attempted by ethylene/propylene block copolymer alone, the deterioration in the rigidity, strength and resistance to high temperature to some extent is almost inevitable. Whereas, the composition according to this invention has a rigidity, strength and resistance to high temperature about as high as those of crystalline polypropylene, yet, it has well-balanced physical properties comparable to those of ethylene/propylene block copolymer, and in addition, various useful shaped articles, fibers and films can be obtained therefrom easily and inexpensively.

The polypropylene used in practising this invention is a highly specific crystalline polypropylene having an insoluble portion in boiling n-heptane of not less than 90 percent by weight and a melt flow index of 0.1–100 as measured according to ASTM D1238-57T at 230° C. with a load of 2,160 g. Such polypropylene having various melt flow indexes may be used depending upon the purpose of the composition contemplated.

Polyethylene which may be used in the composition of this invention can either be a high density polyethylene having a density not less than 0.93 as measured at 23° C., or, a low density polyethylene having a density ranging 0.90–0.93 on the same basis as set forth above. However, when a remarkable improvement in the impact resistance at low temperatures is particularly desired, the use of a high density polyethylene having relatively low melt flow index is preferable.

The ethylene/propylene block copolymer referred to herein designates a copolymer containing monomeric ethylene and propylene as constituents which are not distributed in a statistical fashion in a polymeric chain, respectively, but are present blockwise with respect to each other.

More particularly, it designates an ethylene/propylene block copolymer having an average molecular weight of not less than 10,000 and ethylene content of 7–93 mol percent, preferably 15–85 mol percent, in which a polymeric molecular chain is formed by homopolymeric ethylene block and homopolymeric propylene block alone; or, by homopolymeric ethylene or propylene block and statistical copolymeric blocks of ethylene and propylene; or, by statistical copolymeric blocks having different composition with respect to monomeric ethylene and propylene in every individual block.

In order to obtain the composition of this invention having a remarkably improved impact resistance at low temperatures while retaining the rigidity, strength and resistance to high temperature about as high as those of crystalline polypropylene, it is necessary to use 50–90 percent by weight of crystalline polypropylene, 5–30 percent by weight of polyethylene and 5–40 percent by weight of ethylene/propylene block copolymer.

In a composition using the ingredients outside the range set forth above, a good balance between the impact resistance and other mechanical properties such as the tensile modulus, hardness, etc., may not be retained and such composition has a poor utility.

In the blended composition of this invention, a small amount of conventional thermal and/or light stabilizers may be incorporated into the composition in accordance with the conventional procedures to take precautions not to degrade the qualities of respective constituent polymers in the mixing or moulding process as well as in the actual use of the composition.

In practicing the present invention, it is important to carry out the mixing uniformly in a molten state and a suitable temperature must be selected for an optimum uniform mixing. For this purpose, the mixing by a roll, extruder, Bunbury mixer, or other conventional mixing methods may be conveniently adopted.

In the mixing operation for blending crystalline polypropylene, ethylene/propylene block copolymer and polyethylene, these three ingredients may be blended simultaneously altogether, or, two of these three ingredients may be first blended followed by blending the remaining ingredient therewith.

DESCRIPTION OF THE PREFERRED EMBODIMENTS

The following examples will illustrate this invention more practically. It should not be construed, however, that these examples restrict this invention as they are given merely by way of illustration.

In the following examples, percentages referred to therein are percent by weight unless otherwise specifically indicated.

EXAMPLES 1–2

Hydrogen-added propylene was polymerized in n-hexane in the presence of a catalyst comprising titanium trichloride and diethylaluminum chloride for an hour. At the end of the period, the supply of propylene was stopped and, after removing the unreacted propylene monomer under a reduced pressure, there was supplied hydrogen-added ethylene for 20 minutes, then, hydrogen-added propylene was again polymerized for an hour. The continuous polymerization was carried out by repeating the above-mentioned procedures.

The resulting copolymer was purified by methanol containing hydrochloric acid and there was obtained a powdered crystalline ethylene/propylene block copolymer.

The resulting copolymer had an intrinsic viscosity as measured in tetralin at 135° C., hereinafter referred to simply as "intrinsic viscosity", of 3.0 and an insoluble portion in n-heptane of 95 percent. According to the conventional infrared absorption spectrography, it was found that ethylene content in the resulting copolymer was 35 mol percent.

For comparison, there was obtained a polypropylene having an intrinsic viscosity of 2.8 and an insoluble portion in n-heptane of 94.5 percent according to the same procedures as described above except the supply of hydrogen-added ethylene was omitted.

A high density polyethylene having a density of 0.95 as measured at 23° C. and an average molecular weight of 80,000 and the above-mentioned two ingredients in predetermined proportions were melt kneaded by using a Bunbury mixer under a nitrogen atmosphere at 190° C. for 10 minutes The mix thus kneaded was subsequently rolled on an open roll at room temperature and the resulting sheet was pelletized at 230° C. under a nitrogen atmosphere by using a screw extruder type pelletizer.

The composition thus obtained was compression moulded according to the method described in ASTM D638–61 to give a test piece of a dumbbell shape. After the test piece was conditioned for 72 hours, the physical properties thereof were measured and evaluated according to the following ASTM Standards:

Izod impact strength:
ASTM D256–56 unit—kg.cm./cm.
(Notched) Measured at 23° C., 0° C. and −30° C.
Tensile modulus:
ASTM D638–61T unit—kg./mm.$^2$
(Cross head speed: 0.2 inch/min.)
Rockwell hardness:
ASTM D785–51 unit—R scale
Drop-Cone impact strength:
A test piece of 2 mm. thickness was cooled at −20° C. for an hour and a corn-shaped weight was dropped thereon from a predetermined height and the energy required to destroy the sample was measured in terms of k.·m. by using a Falling Missile Impact Tester made by Toyo Seiki Mfg., Co.

For comparison, the physical properties of the binary compositions consisting of crystalline polypropylene and polyethylene; and crystalline polypropylene and ethylene/propylene block copolymer blended similar to the above-mentioned ternary composition were measured respectively. The results are shown in the following table 1:

TABLE 1

| | Composition (percent) | | | Izod impact strength kg. cm./cm. | | | Drop-corn impact strength (−20° C.) | Tensile modulus (kg./mm.$^2$) | Rockwell hardness (R scale) |
|---|---|---|---|---|---|---|---|---|---|
| | Crystalline polypropylene | Polyethylene | Ethylene/propylene block copolymer | 23° C. | 0° C. | −30° C. | | | |
| Comparative examples: | | | | | | | | | |
| 1 | 100 | 0 | 0 | 2.5 | 1.75 | 1.70 | 0.07 | 118 | 86 |
| 2 | 90 | 10 | 0 | 3.7 | 1.80 | 1.70 | 0.09 | 110 | 79 |
| 3 | 80 | 20 | 0 | 3.8 | 1.86 | 1.71 | 0.12 | 108 | 76 |
| 4 | 70 | 30 | 0 | 3.8 | 1.90 | 1.80 | 1.13 | 100 | 70 |
| 5 | 90 | 0 | 10 | 2.45 | 1.72 | 1.70 | 0.08 | 111 | 80 |
| 6 | 80 | 0 | 20 | 2.60 | 1.74 | 1.69 | 0.08 | 103 | 79 |
| 7 | 70 | 0 | 30 | 2.70 | 1.72 | 1.70 | 0.09 | 102 | 77 |
| Examples: | | | | | | | | | |
| 1 | 70 | 15 | 15 | 8.7 | 55 | 40 | 7.00 | 110 | 81 |
| 2 | 70 | 10 | 20 | 9.5 | 55 | 42 | 7.50 | 109 | 79 |

As shown in the above table 1, practically no enhancement in the impact resistance at low temperatures is observed with regards to the crystalline polypropylene, the binary composition of crystalline polypropylene/polyethylene and the binary composition of crystalline polypropylene and ethylene/propylene block copolymer of the comparative examples.

In contrast, the compositions of this invention shown in examples 1 and 2 exhibit quite excellent impact resistance and the tensile modulus and hardness are about as high as those of crystalline polypropylene.

EXAMPLES 3-4

The ternary compositions were obtained by using various amounts of a crystalline polypropylene having an intrinsic viscosity of 1.5 and an insoluble portion in n-heptane of 96 percent; a polyethylene having a density of 0.93 and an average molecular weight of 50,000; and an ethylene/propylene block copolymer having an intrinsic viscosity of 3.5, an insoluble portion in n-heptane of 96 percent and an ethylene content of 45 mol percent as determined by the conventional infrared spectrography obtained according to the same procedures as described in examples 1-2 except that the amount of hydrogen-added ethylene supplied was changed.

For comparison, the binary composition of crystalline polypropylene and polyethylene and the binary composition of crystalline polypropylene and ethylene/propylene block copolymer were obtained, respectively.

The test pieces were prepared according to the procedures as described in examples 1-2 and the physical properties thereof were measured and evaluated according to ASTM Standards:

The results are shown in the following table 2.

TABLE 2

| | Composition (percent) | | | Izod impact strength kg. cm./cm. | | | Drop-corn impact strength (−20° C.) | Tensile modulus (kg./mm.$^2$) | Rockwell hardness (R scale) |
|---|---|---|---|---|---|---|---|---|---|
| | Crystalline polypropylene | Polyethylene | Ethylene/propylene block copolymer | 23° C. | 0° C. | −30° C. | | | |
| Comparative examples: | | | | | | | | | |
| 8 | 100 | 0 | 0 | 2.45 | 1.70 | 1.71 | 0.07 | 119 | 87 |
| 9 | 70 | 30 | 0 | 3.7 | 1.80 | 1.70 | 0.13 | 97 | 68 |
| 10 | 70 | 0 | 30 | 2.9 | 1.75 | 1.70 | 0.09 | 102 | 77 |
| Examples: | | | | | | | | | |
| 3 | 70 | 15 | 15 | 8.6 | 5.5 | 4.1 | 7.60 | 109 | 79 |
| 4 | 70 | 10 | 20 | 10.0 | 5.9 | 4.3 | 8.90 | 107 | 78 |

As can be noted from the above table 2, the ternary compositions of this invention shown in examples, 3-4 have higher impact strength at low temperatures and good balancing of physical properties as compared with the comparative examples 8-10.

EXAMPLES 5-6

The ternary compositions were obtained by using various amounts of an ethylene/propylene block copolymer having an intrinsic viscosity of 2.4, an insoluble portion in n-heptane of 80 percent and an ethylene content of 23 mol percent as determined by the conventional infrared absorption spectrography obtained according to the same procedures as described in examples 1-2 except that a mixture of ethylene and propylene was used in place of the hydrogen-added ethylene; a crystalline polypropylene having an intrinsic viscosity of 2.0 and an insoluble portion in n-heptane of 96 percent; and a polyethylene having a density of 0.96 and an average molecular weight of 100,000.

For comparison, the binary composition of crystalline polypropylene and polyethylene and the binary composition of crystalline polypropylene and ethylene/propylene block copolymer were obtained.

The test pieces were prepared according to the same procedures as described in examples 1-2 and the physical properties thereof were measured and evaluated according to ASTM Standards. The results are shown in the following table 3:

TABLE 3

| | Composition (percent) | | | Izod impact strength kg. cm./cm. | | | Drop-corn impact strength (−20° C.) | Tensile modulus (kg./mm.$^2$) | Rockwell hardness (R scale) |
|---|---|---|---|---|---|---|---|---|---|
| | Crystalline polypropylene | Polyethylene | Ethylene/propylene block copolymer | 23° C. | 0° C. | −30° C. | | | |
| Comparative examples: | | | | | | | | | |
| 11 | 100 | 0 | 0 | 2.4 | 1.72 | 1.75 | 0.07 | 117 | 86 |
| 12 | 80 | 20 | 0 | 3.8 | 1.86 | 1.70 | 0.12 | 107 | 76 |
| 13 | 80 | 0 | 20 | 2.6 | 1.74 | 1.70 | 0.08 | 102 | 69 |
| Examples: | | | | | | | | | |
| 5 | 80 | 10 | 10 | 7.0 | 4.1 | 2.9 | 6.50 | 107 | 79 |
| 6 | 80 | 5 | 15 | 7.5 | 4.2 | 3.5 | 7.00 | 108 | 80 |

As shown in the above table 3, the ternary compositions of this invention of example 5-6 have improved impact resistances at low temperatures and well-balanced physical properties as compared with the comparative examples 11-13.

EXAMPLES 7-8

The ternary compositions and the binary compositions as comparative examples were obtained by using various amounts of crystalline polypropylene and polypropylene and polyethylene as used in examples 1-2, and an ethylene/propylene block copolymer having an intrinsic viscosity of 3.1, an insoluble portion in n-heptane of 80 percent and an ethylene content of 52 mol percent as determined by the conventional infrared absorption spectrography obtained according to the same procedures as described in examples 1-2 except that a mixture of ethylene and propylene was supplied in place of hydrogen-added propylene.

The physical properties of these compositions were measured and evaluated as in the preceding examples. The results are shown in the following table 4:

TABLE 4

| | Composition (percent) | | | Izod impact strength kg. cm./cm. | | | Drop-corn impact strength (−20° C.) | Tensile modulus (kg./mm.$^2$) | Rockwell hardness (R scale) |
|---|---|---|---|---|---|---|---|---|---|
| | Crystalline polypropylene | Polyethylene | Ethylene/propylene block copolymer | 23° C. | 0° C. | −30° C. | | | |
| Comparative example: | | | | | | | | | |
| 14 | 80 | 0 | 20 | 3.9 | 2.1 | 1.78 | 0.11 | 106 | 75 |
| Examples: | | | | | | | | | |
| 7 | 80 | 10 | 10 | 9.5 | 6.0 | 4.2 | 8.50 | 107 | 80 |
| 8 | 80 | 5 | 15 | 10.1 | 7.0 | 4.5 | 9.20 | 107 | 79 |

As shown in the above table 4, the compositions of this invention have an excellent impact resistance and well-balanced physical properties.

We claim:

1. A polypropylene composition having excellent impact resistance comprising:
   a. from about 50 to about 90 percent by weight of a crystalline polypropylene having an insoluble portion in boiling n-heptane of not less than 90 percent by weight and a melt flow index of from about 0.1 to about 100 as measured according to ASTM D1238-57T at 230° C. with a load of 2,160 g.;
   b. from about 5 to about 30 percent by weight of a polyethylene having an average molecular weight of at least about 50,000; and
   c. from about 5 to about 40 percent by weight of a crystalline ethylene propylene block copolymer having an average molecular weight of at least about 10,000, an ethylene content of from about 7 to about 93 mol percent, at least about 80 percent thereof being insoluble in n-heptane, and being selected from the group consisting of
      1. homopolymeric ethylene blocks and homopolymeric propylene blocks;
      2. homopolymeric ethylene blocks and random copolymeric blocks of ethylene and propylene; and
      3. homopolymeric propylene blocks and random copolymeric blocks of ethylene and propylene.

2. A composition of claim 1, wherein the polyethylene of (b) has a density of not less than 0.93, as measured at 23° C.

3. A composition of claim 1, wherein the polyethylene of (b) has a density of from 0.90 to 0.93, as measured at 23° C.

4. A composition of claim 1, wherein the polyethylene of (b) has an average molecular weight of from about 50,000 to about 23°

5. A composition of claim 1, wherein the ethylene content is from about 15 to about 85 mol percent.

6. A composition of claim 1, wherein the copolymer of (c) has an insolubility in n-heptane of from about 80 percent to about 96 percent.

7. A composition of claim 1, wherein the copolymer of (c) has an intrinsic viscosity of from 2.4 to 3.5 in tetralin at 135° C.

* * * * *